(12) United States Patent
Szczerba et al.

(10) Patent No.: US 7,373,229 B2
(45) Date of Patent: May 13, 2008

(54) MULTIFUNCTION CONTROL SYSTEM

(75) Inventors: Joseph F. Szczerba, Grand Blanc, MI (US); John K. Lenneman, Okemos, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 480 days.

(21) Appl. No.: 11/194,134

(22) Filed: Jul. 29, 2005

(65) Prior Publication Data
US 2006/0022521 A1 Feb. 2, 2006

Related U.S. Application Data

(60) Provisional application No. 60/592,080, filed on Jul. 29, 2004.

(51) Int. Cl.
- G05G 9/047 (2006.01)
- G06F 3/033 (2006.01)
- G06F 19/00 (2006.01)

(52) U.S. Cl. .............................. 701/36; 701/1; 345/184
(58) Field of Classification Search .................... None
See application file for complete search history.

(56) References Cited

U.S. PATENT DOCUMENTS

| | | | |
|---|---|---|---|
| 6,756,967 B2 * | 6/2004 | Onodera et al. | 345/161 |
| 6,769,320 B1 * | 8/2004 | Bollgohn et al. | 73/866.3 |
| 6,998,971 B2 * | 2/2006 | Ito et al. | 340/438 |
| 7,218,312 B2 * | 5/2007 | Takaku | 345/158 |
| 2003/0023353 A1 * | 1/2003 | Badarneh | 701/1 |
| 2003/0234764 A1 * | 12/2003 | Noguchi et al. | 345/156 |
| 2004/0118664 A1 * | 6/2004 | DePue et al. | 200/4 |
| 2005/0168435 A1 * | 8/2005 | Reed et al. | 345/156 |

FOREIGN PATENT DOCUMENTS

| | | | |
|---|---|---|---|
| DE | 10207872 A1 | * | 9/2003 |
| EP | 1215556 A2 | * | 8/2002 |
| FR | 2731090 | * | 8/1996 |
| JP | 07-257231 | * | 10/1995 |
| JP | 10-144182 | * | 5/1998 |

OTHER PUBLICATIONS

McCullough et al., "New 12-Cylinder W12. W Stands for Wow," www.automotive.com, downloaded Jul. 21, 2005.
Brauer, "Why iDrive Won't Fly," www.edmunds.com, posted Jul. 8, 2004.

* cited by examiner

Primary Examiner—Michael J. Zanelli

(57) ABSTRACT

A control system for a vehicle with a plurality of selectively variable characteristics includes an input member and a generally cylindrical wheel. The input member is manipulable to cause a first mode of operation and a second mode of operation. In the first mode of operation, the wheel is pivotable to cause a first submode of operation and to cause a second submode of operation. In the second mode of operation, the wheel is pivotable to cause a third submode of operation to cause a fourth submode of operation. Rotating the wheel in each of the submodes causes a variation in a respective variable characteristic. The control system thus enables a single finger wheel to control multiple characteristics or multiple vehicle systems, which enables a corresponding reduction in the quantity of switches and other control input devices in a vehicle passenger compartment.

8 Claims, 5 Drawing Sheets

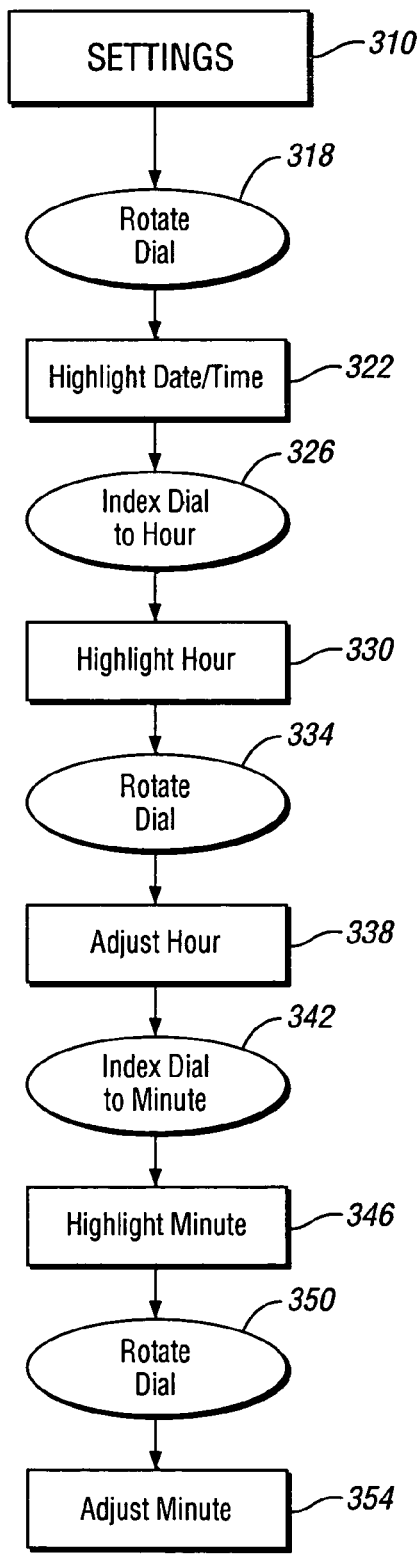
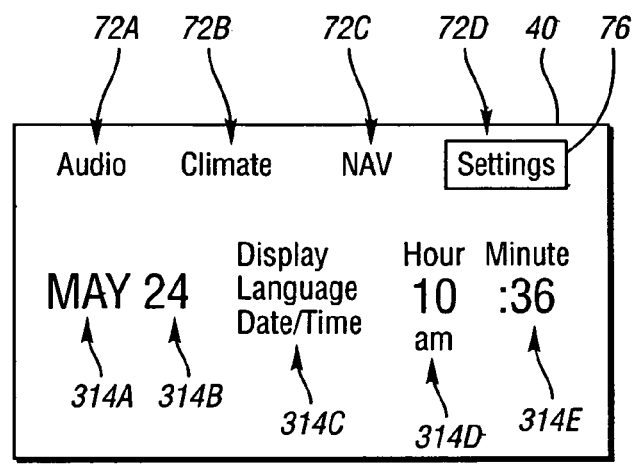
FIG. 4b
FIG. 4a

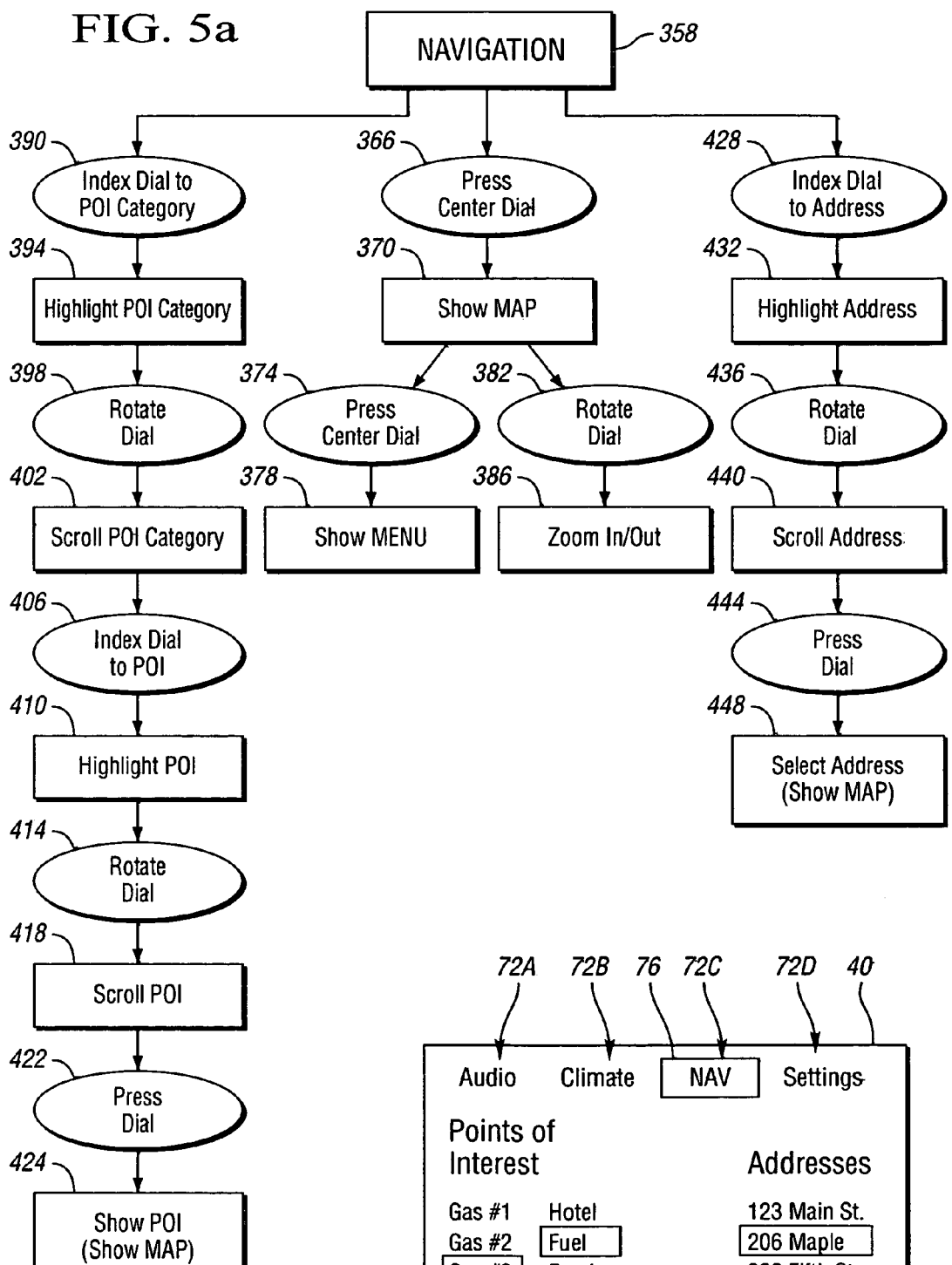

MULTIFUNCTION CONTROL SYSTEM

CROSS REFERENCE TO RELATED APPLICATION

This application claims the benefit of U.S. Provisional Patent Application No. 60/592,080, filed Jul. 29, 2004, and which is hereby incorporated by reference in its entirety.

TECHNICAL FIELD

This invention relates to vehicle control systems that include a pivotable and rotatable finger wheel that is manipulable to alter variable vehicle characteristics.

BACKGROUND OF THE INVENTION

A motor vehicle typically includes a multitude of components and systems that enhance the comfort and convenience of the driver and passengers. Such systems include, for example, audio systems having a radio, speakers, compact disc player, and cassette player; climate systems having heating, ventilation, and air conditioning components; navigational systems; etc.

Each of the systems typically includes an interface through which the driver of the vehicle can interact with the system. For example, control of a system requires that the driver of the vehicle input command information via the interface to which the system is responsive to vary a system characteristic. Each system may also supply information to the driver via the interface. For example, an audio system will indicate the radio station to which it is tuned, a climate control system will indicate the fan speed or the thermostat setting, and a navigational system will indicate location information.

Each system typically includes its own dedicated interface. Thus, for example, a climate control system includes a plurality of switches, buttons, dials, etc. that are operable to control only the climate control system. Similarly, an audio system includes a plurality of switches, buttons, dials, etc. that are operable only to control the audio system.

SUMMARY OF THE INVENTION

A control apparatus for a vehicle includes a generally cylindrical wheel being selectively rotatable about a first axis and selectively pivotable about a second axis perpendicular to the first axis. An input member is selectively manipulable by a driver or passenger of the vehicle. A controller is operatively connected to the wheel and the input member.

The control apparatus is configured such that manipulating the input member causes the controller to alternate between first and second modes of operation. The control apparatus is configured such that pivoting the wheel in the first mode causes the controller to alternate between first and second submodes of operation, and pivoting the wheel in the second mode causes the controller to alternate between third and fourth submodes of operation.

The controller is configured to alter a first variable vehicle characteristic in response to rotation of the wheel in the first submode, a second variable vehicle characteristic in the second submode, a third variable vehicle characteristic in the third submode, and a fourth variable vehicle characteristic in the fourth mode. Where used in the claims, "alternating" between two modes or submodes means alternating between at least two modes or submodes.

Thus, the wheel is reconfigurable to control multiple vehicle systems or multiple variable characteristics, effectively reducing the number of input devices in a vehicle cockpit. The control apparatus thus provides increased interior styling options compared to the prior art by reducing the styling constraints imposed by a large quantity of input devices. By reducing the number of input devices in a vehicle cockpit, the multifunction control apparatus may also improve human-vehicle interaction by enabling input devices that are situated in preferred locations within easy reach of the driver to control more vehicle systems.

Examples of vehicle systems include a climate system having variable characteristics such as air temperature, fan speed, and air flow mode; an audio system having variable characteristics such as radio tuner frequency, volume, compact disc track playing; a navigational system having variable characteristics such as point of interest selected, address selected, programmable vehicle destination information, etc.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 4a is a flow diagram depicting an exemplary control program for the control system of FIG. 1 in a third operating mode;

FIG. 4b is a schematic depiction of the display of FIG. 1 in the third operating mode;

FIG. 5a is a flow diagram depicting an exemplary control program for the control system of FIG. 1 in a fourth operating mode; and FIG. 5b is a schematic depiction of the display of FIG. 1 in the fourth operating mode.

DESCRIPTION OF THE PREFERRED EMBODIMENTS

Figure 1:
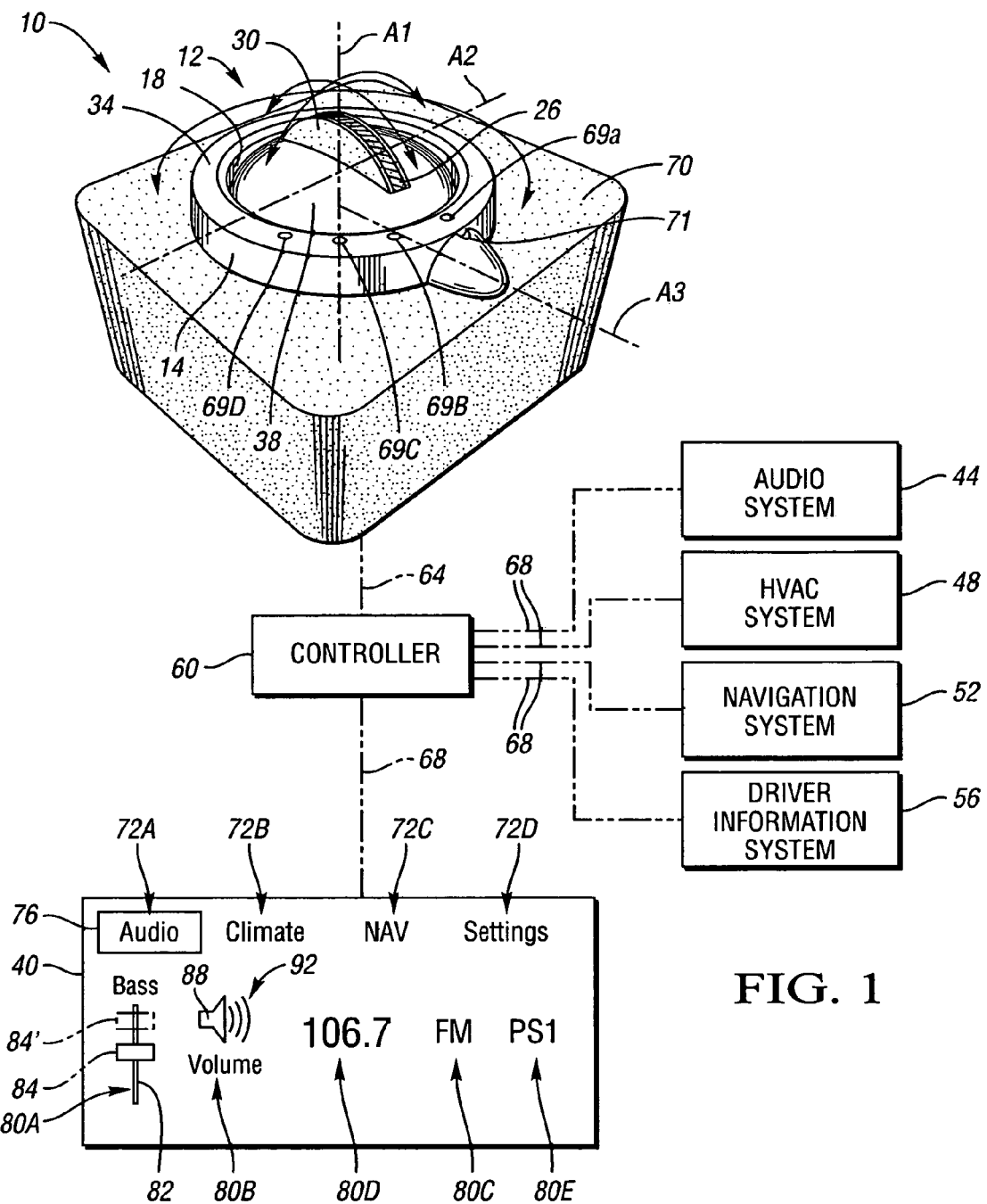
FIG. 1 is a schematic depiction of a vehicle with vehicular systems and a control system with a collar, a rotatable finger wheel, and a display for controlling the vehicular systems.
Figure 1A:
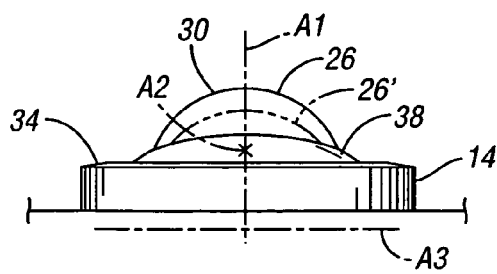
FIG. 1a is a schematic elevational view of the collar and wheel of FIG. 1.
Figure 1B:
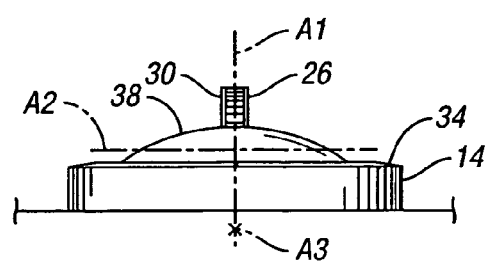
FIG. 1b is another schematic elevational view of the collar and wheel of FIG. 1.

Referring to FIGS. 1, 1a, and 1b, a multi-function control system 10 is schematically depicted. The multi-function control system 10 includes an input device 12 having a rotary collar 14. The rotary collar 14 is annular in shape and defines an annular or cylindrical space 18 at its inner diameter. The rotary collar 14 is selectively rotatable about an axis A1 that is coextensive with the center point of the collar 14. The input device 12 further includes a finger wheel 26. The finger wheel 26 is circular in cross section and is selectively, freely, rotatable about an axis A2 that is generally perpendicular to the axis A1 about which the rotary collar 14 is rotatable.

The finger wheel 26 is positioned with respect to the rotary collar 14 such that at least a portion 30 of the finger wheel 26 extends through the annular or cylindrical space 18 and above the upper surface 34 of the rotary collar 14. Portion 30 is thus accessible to a driver or passenger for manipulation to control various vehicle components and systems.

The finger wheel 26 is supported by, and partially within, a member 38 that is movable such that the finger wheel 26 is also pivotable about an axis A3 that is perpendicular to axis A1 and axis A2. The finger wheel 26 is biased in a default position with respect to the collar 14 as shown in the Figures, and is pivotable approximately 45 degrees in each direction about axis A3. Finger wheel 26 is also movable to a depressed position, shown at 26' in FIG. 1a.

Thus, the input device 12 is manipulable for four different input modes, namely, rotation of the collar, pivoting of the finger wheel, rotation of the finger wheel, and depression of the finger wheel. The input device 12 is preferably located on a center console between a driver's seat and a passenger's seat, on an instrument panel, or on a steering wheel. The rotary collar 14 and the finger wheel 26 may also be charaterized by haptic feedback characteristics, i.e., variations in resistance to rotation caused by springs, feedback motors, detents, etc.

Referring specifically to FIG. 1, the control system 10 includes a display 40 that is situated for viewing within the passenger compartment of the vehicle. Exemplary display 40 locations include an instrument panel, gauge cluster, heads up display, base of windshield, A-pillar, etc.

The vehicle includes four controllable systems: an audio system 44, a climate system 48, a navigation system 52, and a driver information system 56. In an exemplary embodiment, the climate system 48 includes an air conditioner for providing cooled air, a heater for providing heated air, and ducts and vents for providing the heated or cooled air to the vehicle passenger compartment (not shown). The ducts are configured to selectively provide air to a first set of vents below an instrument panel, to a second set of vents formed inside the instrument panel and positioned to direct air generally rearward, and a third set of vents formed in the instrument panel and positioned to direct air to a windshield for use in defrosting, as understood by those skilled in the art. Each of systems 44, 48, 52, 56 has a plurality of selectively variable system characteristics.

The control system 10 includes a controller 60 configured to receive input signals 64 that are generated by manipulation of the rotary collar 14 and finger wheel 26, and configured to transmit control signals 68 to the display 40, the climate system 48, the audio system 44, the navigational system 52, and the driver information system 56 so that the control system 10 functions as described herein.

The controller 60 is programmed and configured to provide the control system 10 with four modes of operation. In a first mode of operation, the finger wheel 26 is manipulable to alter variable characteristics of the audio system. In a second mode of operation, the finger wheel 26 is manipulable to alter variable characteristics of the climate system. In a third mode of operation, the finger wheel 26 is manipulable to alter variable characteristics of the navigation system. In a fourth mode of operation, the finger wheel 26 is manipulable to alter variable characteristics of the driver information system. Each of the four modes is characterized by a plurality of sub-modes in which the rotation of the finger wheel causes alteration of a respective variable characteristic.

In the context of the present invention, manipulation of an input member, such as the collar or the finger wheel, "enables the variation" or "causes the variation" of a variable characteristic if the manipulation, either by itself or in conjunction with another action, causes a change in the variable characteristic. Thus, for example, and within the scope of the claimed invention, rotation of the finger wheel enables or causes the variation of a variable characteristic if the control system causes the characteristic to change automatically upon the rotation. Similarly, and within the scope of the claimed invention, rotation of the finger wheel enables or causes the variation of a variable characteristic if the control system causes the characteristic to change upon the rotation and an additional input by the driver, such as depressing the finger wheel.

The controller 60 is configured such that rotation of the collar 14 causes the control system 10 to alternate between the first, second, third, and fourth modes of operation. The collar 14 includes four circular markings 69A, 69B, 69C, 69D or other visible features spaced a distance apart from one another. The base 70 of the input device 12 includes marking 71. When marking 69A is aligned with marking 71, as shown in FIG. 1, the control system is in the first mode of operation. When marking 69B is aligned with marking 71, the control system is in the second mode of operation. When marking 69C is aligned with marking 71, the control system is in the third mode of operation. When marking 69D is aligned with marking 71, the control system is in the fourth mode of operation.

The display 40 is configured to selectively depict indicia representing the current state of the control system and variable system characteristics. More specifically, the controller 60 is configured to cause the display 40 to depict a plurality of icons. Each icon is a symbol that is representative of a vehicle component or system, or representative of a variable characteristic of a vehicle component or system. The icons, which may also be referred to herein as "indicia," may include alphanumeric characters, numbers, graphs, lists, etc., within the scope of the claimed invention.

The display 40 provides information to the driver about the vehicle systems, and provides visual feedback of input device 12 manipulation. Four icons 72A-D are depicted on the display 40. Icon 72A represents the audio system 44, icon 72B represents the climate system 48, icon 72C represents the navigational system 52, and icon 72D represents the driver information system 56.

The appearance of icons 72A-D is responsive to rotation of collar 14 to indicate in which of the four modes the control system is operating. More specifically, the controller 40 is configured to change the appearance of the icon representing the system that is presently controllable by manipulation of the finger wheel 26. In the embodiment depicted, the icon representing the system selected for control includes a box 76. Those skilled in the art will recognize other means of changing the appearance of an icon that may be employed within the scope of the claimed invention, such as changing the size of the icon, changing the color of the icon, etc.

In FIG. 1, icon 72A includes box 76 to indicate that the control system 10 is in the first mode of operation wherein the manipulation of the finger wheel 26 enables variation in audio system 44 characteristics. Accordingly, the display 40 depicts a first set of icons 80A-E, each indicating the present status of a respective audio system characteristic, or what the status will be after an additional input by the driver. Icon 80A includes a line 82 and a bar 84 intersecting, and perpendicular to, the line 84; icon 80A represents audial characteristics of the speakers, which, in FIG. 1, is the bass level. Icon 80B includes a schematic depiction of a speaker 88 with curvilinear lines 92 adjacent thereto, and represents the speaker volume. Icon 80C is an alphanumeric representation of the general source from which the audio system is receiving audial content, which, in FIG. 1, is the FM (frequency modulation) band. Icon 80D is an alphanumeric representation of the specific source from which the audio system is receiving audial content, which, in FIG. 1, is the FM frequency to which the radio of the audio system 24 is tuned. Icon 80E is an alphanumeric representation of which of several frequencies stored in memory (i.e., "preset stations"), if any, is selected by the user as a source of audio content and represented by icon 80D.

Figures 2A, 2B:
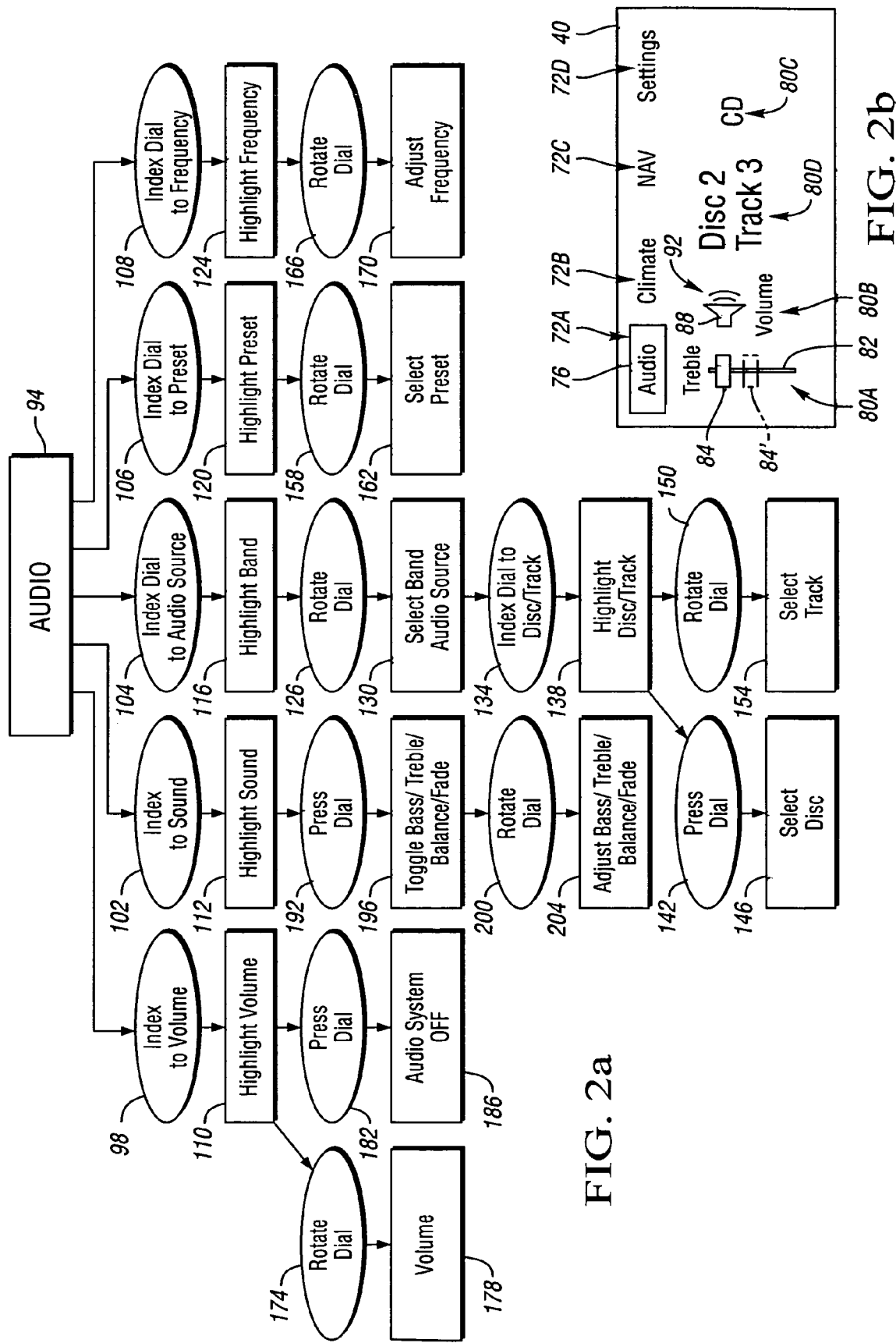
FIG. 2a is a flow diagram depicting an exemplary control program for the control system of FIG. 1 in a first operating mode.
FIG. 2b is a schematic depiction of the display of FIG. 1 in the first operating mode.

FIG. 2a depicts an exemplary audio system control program for the controller 60 when the control system 10 is in the first mode of operation. Referring to FIGS. 1 and 2a, rotating collar 14 such that marking 69A is aligned with marking 71 causes the control system to operate in the first mode of operation (step 94). In the first mode of operation, the finger wheel 26 is pivotable about axis A3 at steps 98, 102, 104, 106, 108 to cause the controller to alternate between five submodes of operation at steps 110, 112, 116, 120, 124. The wheel is manipulable in the five submodes to alter a respective variable characteristic of the audio system represented by the icons 80A-E.

As noted above, the finger wheel is pivotable in two direction about axis A3 from its default position. When the control system is in a first submode of control system operation, the controller highlights a first icon representing the first submode, i.e., the icon representing the variable characteristic that is alterable by depressing or rotating the wheel. Pivoting the finger wheel to the right causes a second submode of control system operation represented by a second icon immediately to the right of the first icon, wherein rotating or depressing the wheel effects a change in the variable characteristic represented by the second icon. Similarly, when in the first submode of control system operation, pivoting the finger wheel to the left causes a third submode of control system operation represented by a third icon immediately to the left of the first icon, wherein rotating or depressing the wheel effects a change in the variable characteristic represented by the third icon.

Thus, for example, when the control system is in the submode in which icon 80C is highlighted and the general source of audial content is alterable by manipulation of the finger wheel, then pivoting the finger wheel to the left once will cause icon 80D to be highlighted and a submode of control system operation in which the specific source of audial content is alterable by manipulation of the finger wheel. Pivoting the finger wheel to the left twice when icon 80C is highlighted causes icon 80B to be highlighted, and a submode of control system operation in which the speaker volume is alterable by rotation of the finger wheel. Those skilled in the art will recognize various ways to highlight i.e., visually differentiate, the icon from the other icons, such as changing the size of the icon, the color of the icon, adding an element, such as a box, to the icon, etc.

When the finger wheel 26 has been pivoted at step 104 such that the audio source icon 80C is highlighted at step 116, the control system is in a submode in which the general source of audial content is alterable by manipulation of the finger wheel. Rotating the finger wheel 26 at step 126 causes the controller to alter the general source of audial content (step 130), e.g., a compact disk player, the frequency modulation (FM) radio band, the amplitude modulation (AM) radio band, etc., with a corresponding change to icon 80C. Thus, for example, if rotation of the finger wheel at step 126 causes the audio source to change from the FM band to a compact disk player, icon 80C indicates the the compact disk is the general source of audio content, as shown in FIG. 2b. In FIG. 2b, icon 80D shows the specific source of audio content when the compact disk player is selected, namely which of several stored compact disks is playing, and the specific track of the compact disk that is playing.

When the compact disk player is the source of audio content, the finger wheel is pivotable at step 134 such that the control system is in a submode in which the specific source of audio content is alterable by manipulation of the finger wheel 26, and in which icon 80D is highlighted (step 138). Depressing the wheel at step 142 causes the controller to alter which of the several stored compact disks is playing at step 146, with a corresponding change to icon 80D, and rotating the wheel at step 150 causes the controller to alter, at step 154, the compact disk track being played, with a corresponding change to icon 80D.

When a radio band is selected at steps 126 and 130, pivoting the finger wheel at step 106 such that icon 80E is highlighted at step 120 causes a submode of control system operation in which rotating the dial at step 158 causes the controller to alternate between several preselected frequencies stored in memory ("preset stations") at step 162. When a radio band is selected at steps 126 and 130, pivoting the finger wheel at step 108 such that icon 80D is highlighted at step 124 causes a submode of control system operation in which rotating the finger wheel at step 166 causes the controller to change the frequency to which the radio is tuned at step 170, with a corresponding change to icon 80D. Rotating the finger wheel in one direction at step 166 causes the tuned frequency to increase, and rotating the finger wheel in the other direction at step 166 causes the tuned frequency to decrease. After step 124, depressing the finger wheel causes the frequency represented by icon 80D to be stored in memory as a preset station and available for selection at steps 158 and 162.

Pivoting the finger wheel at step 98 such that icon 80B is highlighted at step 110 causes a submode of control system operation in which rotating the finger wheel in one direction at step 174 causes the volume to increase at step 178, and rotating the finger wheel in the other direction causes the volume to decrease at step 178. Icon 80B is responsive to the rotation of the wheel at step 174 to indicate the volume of the speakers. Concurrently with altering speaker volume at step 178, the controller causes a change in the appearance of icon 80B. The quantity of curvilinear lines 92 in icon 80B is indicative of volume level. In FIG. 1, icon 80B includes three curvilinear lines 92. If the rotation of the finger wheel at step 174 causes a reduction in volume, then the quantity of lines 92 is reduced, as shown in FIG. 3, wherein icon 80B includes only two lines 92. Similarly, if rotation of the finger wheel at step 174 causes an increase in volume, one or more lines 92 are added to icon 80B.

Depressing the finger wheel (step 182) after step 110 causes the controller to alternately turn the audio system on or off (step 186).

Pivoting the finger wheel at step 102 such that icon 80A is highlighted at step 112 results in a submode of control system operation in which speaker characteristics are alterable by manipulation of the finger wheel. After step 112, depressing the wheel at step 192 causes the controller to alternate, at step 196, which of the bass level, the treble level, and balance, and the fade is adjustable by rotating the wheel at step 200. In FIG. 1, icon 80A includes an alphanumeric indicator "BASS" to indicate that rotating the wheel at step 200 causes a change in the bass level. Depressing the wheel once causes the display 40 to change the appearance of icon 80A, as shown in FIG. 2a. Referring to FIG. 2a, icon 80A includes an alphanumeric indicator "TREBLE" to indicate that rotating the wheel at step 200 causes a change in the treble level.

Similarly, depressing the wheel at step 192 again will cause icon 80A to include the text "BALANCE" to indicate that rotating the wheel at step 200 causes variation in the balance. Depressing the wheel at step 192 yet again will cause icon 80A to include the text "FADE" to indicate that rotating the wheel at step 200 causes variation in the fade of the audio system. Those skilled in the art will recognize that "balance" refers to the difference in volume between left and right speakers within the passenger compartment, and that "fade" refers to the difference in volume between front and rear speakers within the passenger compartment.

Accordingly, rotating the wheel at step 200 causes the controller to adjust one of the bass, treble, balance, and fade at step 204, depending on which of the four characteristics is selected at step 196. The controller is configured to alter icon 80A in response to rotation of the wheel at step 200. More specifically, and with reference to FIGS. 1 and 2a, when the bass level is selected, rotation of the finger wheel in one direction at step 200 causes an increase in bass and a corresponding movement of bar 84 to a new position shown in phantom at 84'. Rotation of the wheel in the other direction at step 200 causes a decrease in bass and a corresponding movement of bar 84 farther from the "BASS" text portion of icon 80A. Similarly, with reference to FIGS. 2a and 2b, rotation of the finger wheel at step 200 when the treble level is selected at step 196 causes a variation in treble and a corresponding alteration of icon 80A. Thus, if rotation causes a decrease in the treble level, bar 84 will move to a new position such as the one shown in phantom at 84' in FIG. 2b.

Figures 3A, 3B:
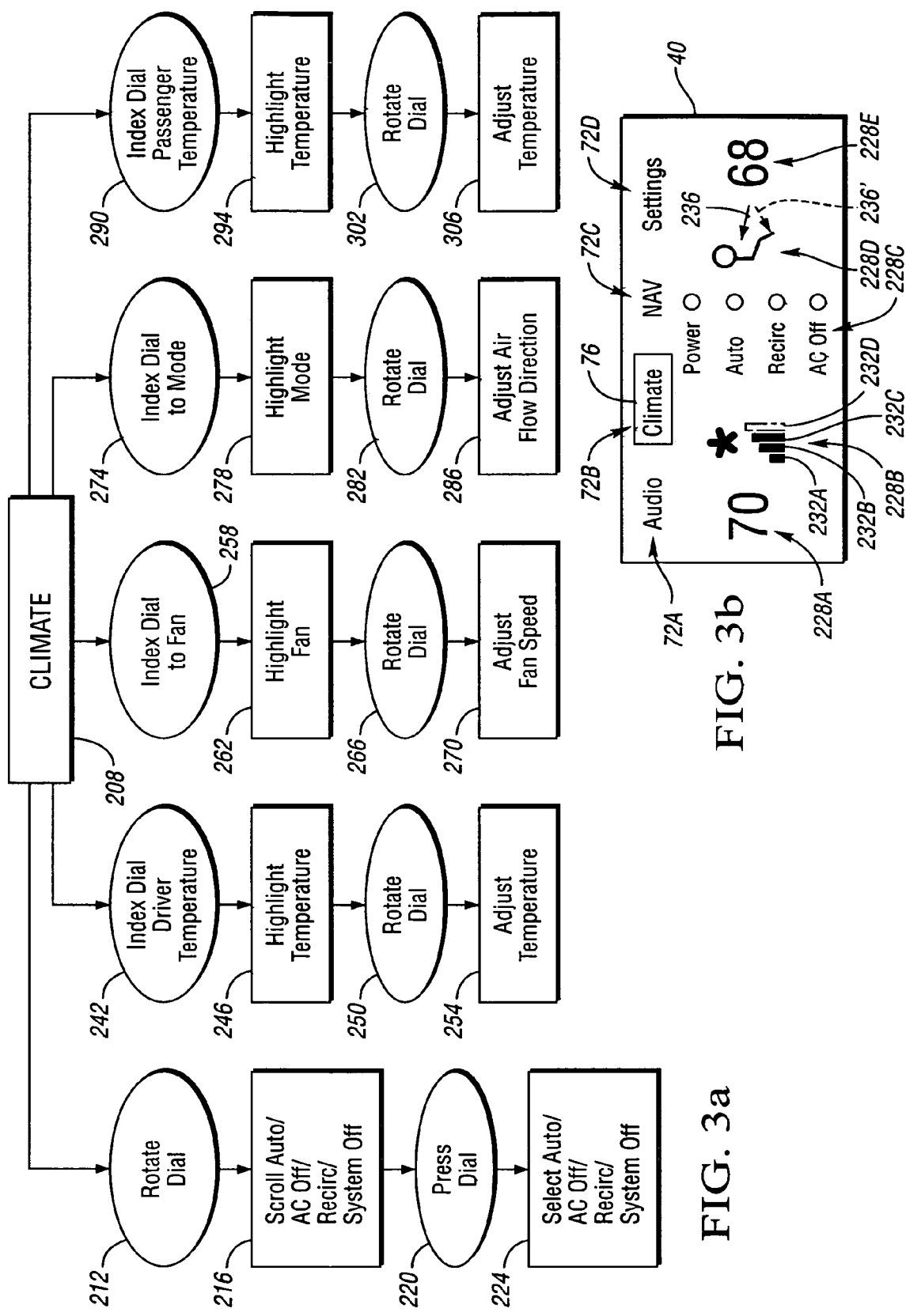
FIG. 3a is a flow diagram depicting an exemplary control program for the control system of FIG. 1 in a second operating mode.
FIG. 3b is a schematic depiction of the display of FIG. 1 in the second operating mode.

Referring to FIG. 3a, an exemplary climate system control program is schematically depicted for the controller when the control system 10 is in the second mode of operation. Rotating the collar 14 such that marking 69B is aligned with marking 71 causes the control system to operate in the second mode of operation at step 208. Accordingly, as shown in FIG. 3b, the controller causes icon 72B to include box 76 to indicate that manipulation of the finger wheel causes variation in climate system characteristics. After step 208, rotating the finger wheel at step 212 causes variation (step 216) in which of four climate system modes of operation is selectable at step 220. Depressing the finger wheel at step 220 causes the selectable climate system mode to be selected and implemented at step 224. The four modes include climate system power (i.e., on/off), an automatic setting, an air recirculation setting, and air conditioning power (i.e., on/off). Referring to FIGS. 3a and 3b, the display 40 depicts a second set of icons 228A-E when the control system is in the second mode of operation. Icons 228A-E indicate the present status of a respective climate system characteristic, or what the status will be after an additional input by the driver. Icon 228C is a list of the climate system modes with a corresponding circle adjacent each climate system submode. The controller causes the circle corresponding to the present climate system mode to be filled at step 224.

Icon 228A is a number that represents the temperature (in degrees Fahrenheit) of air injected into the passenger compartment on the driver's side. Icon 228B includes a series of bars 232A-C of varying, lengths indicating the fan speed. Icon 228D represents the air flow mode of the climate system, and includes a schematic representation of a person and an arrow 236 indicating the vents through which air is flowing into the passenger compartment. In FIG. 3b, the position of arrow 236 indicates that air is flowing into the passenger compartment through the second set of vents. Icon 228E is a number that represents the temperature (in degrees Fahrenheit) of air injected into the passenger compartment on the passenger's side.

Pivoting the finger wheel at step 242 such that icon 228A is highlighted at step 246 causes a submode of control system operation in which rotating the finger wheel at step 250 causes variation of the temperature of air injected into the passenger compartment on the driver's side at step 254. More specifically, rotating the finger wheel in one direction at step 250 causes the controller to increase the temperature of air injected into the driver's side at step 254, with a corresponding change to icon 228A. Rotating the finger wheel in the other direction at step 250 causes the controller to decrease the temperature of air injected into the driver's side at step 254, with a corresponding change to icon 228A.

Pivoting the finger wheel at step 258 such that icon 228B is highlighted at step 262 causes a submode of control system operation in which rotation of the finger wheel at step 266 causes variation in the fan speed at step 270, and thereby causes variation in the volume and speed of air entering the vehicle passenger compartment via the ducts and vents. More specifically, rotating the finger wheel in one direction at step 266 will increase the speed of the fan at step 270, and rotating the finger wheel in the other direction at step 266 will decrease the speed of the fan at step 270. Rotation of the finger wheel at step 266 will cause the icon 228B to change to indicate a change in fan speed. For example, to indicate an increase in fan speed, bar 232D may be added to icon 228B. Similarly, the controller will cause the number of bars to decrease to indicate a decrease in fan speed.

Pivoting the finger wheel at step 274 such that icon 228D is highlighted at step 278 causes a submode of control system operation in which rotation of the finger wheel at step 282 causes variation at step 286 in the air flow mode, that is, the location at which air is injected into the passenger compartment, e.g., adjacent the floor, through vents in the dash panel directed at the passengers, through vents in the dash panel directed at a windshield, etc. Rotation of the finger wheel at step 282 causes a corresponding change in the position of the arrow 163 with respect to the person. For example, if rotation of the finger wheel at step 282 causes the air flow mode to change such that air flows through the third set of vents under an instrument panel, arrow 236 is moved to a new position shown in phantom at 236'.

Pivoting the finger wheel at step 290 such that icon 228E is highlighted at step 294 causes a submode of control system operation in which rotating the finger wheel at step 302 causes variation of the temperature of air injected into the passenger compartment on the passenger's side at step 306. More specifically, rotating the finger wheel in one direction at step 302 causes the controller to increase the temperature of air injected into the passenger's side at step 306, with a corresponding change to icon 228E. Rotating the finger wheel in the other direction at step 302 causes the controller to decrease the temperature of air injected into the passenger's side at step 306, with a corresponding change to icon 228E.

Referring to FIGS. 4a and 4b, an exemplary driver information system control program is schematically depicted for the controller when the control system is in the fourth mode of operation. Rotating the collar 14 such that marking 69D is aligned with marking 71 causes the control system to operate in the fourth mode (step 310). Icon 72D on the display 40 includes box 76 to indicate the fourth mode.

In the fourth mode, the controller causes icons 314A-E to be shown on the display 40. Icon 314A indicates the month to which the calendar of the driver information system is set. Icon 314B indicates the day of the month to which the calendar of the driver information system is set. Icon 314C is a list of settings categories, namely, display, language, and date/time. Icon 314D indicates the hour for which the clock is set, and icon 314E indicates the minutes for which the clock is set. After step 310, icon 314C is highlighted. Rotating the finger wheel at step 318 causes variation in which of the three settings categories is selected. In a preferred embodiment, when a category or element in a list is "selected," the controller causes the corresponding representation on the display 40 of the category or element to be highlighted, i.e., visually differentiated from the other categories or elements such as by size, color, etc. If the date/time category is selected at step 318, then the date/time element in icon 314B is highlighted at step 322.

Pivoting the finger wheel at step 326 such that icon 314D is highlighted at step 330 causes a submode of control system operation in which rotating the finger wheel at step 334 causes variation of the hour to which the clock is set at step 338. More specifically, rotating the finger wheel in one direction at step 334 causes the controller to increase the hour at step 338, with a corresponding change to icon 314D. Rotating the finger wheel in the other direction at step 334 causes the controller to decrease the hour at step 338, with a corresponding change to icon 314D.

Pivoting the finger wheel at step 342 such that icon 314E is highlighted at step 346 causes a submode of control system operation in which rotating the finger wheel at step 350 causes variation of the hour to which the clock is set at step 354. More specifically, rotating the finger wheel in one direction at step 350 causes the controller to increase the minutes at step 354, with a corresponding change to icon 314E. Rotating the finger wheel in the other direction at step 350 causes the controller to decrease the minutes at step 354, with a corresponding change to icon 314E. It should be noted that, although steps 342-354 are depicted after steps 326-338, steps 342-354 may be performed independently of steps 326-338 after the time/date selection is made at steps 318 and 322. Rotating the finger wheel at step 318 such that another of the setting categories is selected causes the display 40 to depict other icons and indicia representing characteristics within the other categories that are alterable by manipulating the finger wheel.

Pivoting the finger wheel such that icon 314A is highlighted causes a submode of control system operation in which rotating the finger wheel results in variation of the month to which the calendar is set, with a corresponding change to icon 314A, and pivoting the finger wheel such that icon 314B is highlighted causes a submode of control system operation in which rotating the finger wheel causes variation of the day of the month to which the calendar is set, with a corresponding change to icon 314B.

Referring to FIGS. 5*a* and 5*b*, an exemplary navigation system control program is schematically depicted for the controller when the control system is in the third mode of operation. Rotating the collar 14 such that marking 69C is aligned with marking 71 causes the control system to operate in the third mode (step 358). Icon 72D on the display 40 includes box 76 to indicate the fourth mode. In the third mode of operation, the display 40 depicts indicia 362A, which is a list of point of interest categories, namely, hotels, fuel, food, and airports. The display also depicts indicia 362B, which is a list of points of interest within one of the categories listed in indicia 362A. Indicia 362C is a list of addresses stored in memory.

Depressing the wheel at step 366 causes a submode of control system operation at step 370 in which the controller causes the display to depict a map (not shown), which shows the present location of the vehicle and a user-selected location of interest. Depressing the wheel at step 374 causes the display to remove the map and display indicia 362A-C at step 378. When a map is depicted on the display, rotating the wheel at step 382 causes the display to "zoom" at step 386. Rotating the wheel in one direction at step 382 causes the display to "zoom in," and rotating the wheel in the other direction at step 382 causes the display to "zoom out."

Pivoting the wheel at step 390 such that indicia 362A is highlighted at step 394 causes a submode of control system operation in which rotating the wheel at step 398 causes variation at step 402 in which of the four point of interest categories is selected. In FIG. 5*b*, the fuel category element in indicia 362A includes a box to indicate that the fuel category is selected. Accordingly, since indicia 362B is a list of points of interest within the category selected at steps 398 and 402, indicia 362B in FIG. 5*b* is a list of fuel providers. Pivoting the wheel at step 406 such that indicia 362B is highlighted at step 410 causes a submode of control system operation in which rotating the wheel at step 414 causes variation at step 418 in which of the points of interest in list 362B is selectable by depressing the wheel at step 422. By depressing the wheel at step 422, a map is shown on the display 40 at step 424 to indicate the location of the point of interest selected at step 422.

Pivoting the wheel at step 428 such that indicia 362C is highlighted at step 432 causes a submode of control system operation in which rotating the wheel at step 436 causes variation at step 440 in which of the addresses shown in list 362C is selectable by depressing the wheel at step 444. By depressing the wheel at step 444, a map is shown on the display 40 at step 448 to indicate the location of the address selected at step 444.

It may be desirable to employ an audio output device to provide audial feedback to the driver. The audio output device would be operatively connected to the controller such that the audio output device generates sounds, such as chimes or beeps, in response to the manipulation of the collar 14 and the finger wheel 26. Further, in a preferred embodiment, the amount of change in a variable characteristic is proportional to the amount of rotation of the finger wheel.

Referring again to FIG. 1, in an alternative embodiment of the control system, rotary collar 14 is replaced with four push buttons. Each button is selectively depressible to cause the control system to operate in a respective one of the four modes of operation.

While the best modes for carrying out the invention have been described in detail, those familiar with the art to which this invention relates will recognize various alternative designs and embodiments for practicing the invention within the scope of the appended claims.

The invention claimed is:

1. A control apparatus for a vehicle characterized by a plurality of variable characteristics, the control apparatus comprising:

a generally cylindrical wheel being selectively rotatable about a first axis and selectively pivotable about a second axis perpendicular to the first axis;

at least one input member being selectively manipulable;

a controller operatively connected to the wheel and said at least one input member;

wherein the control apparatus is configured such that said at least one input member is manipulable to cause the controller to alternate between first and second modes of operation; wherein the control apparatus is configured such that pivoting the wheel in the first mode causes the controller to alternate between first and second submodes of operation, and pivoting the wheel in the second mode causes the controller to alternate between third and fourth submodes of operation; wherein the controller is configured to alter a first of said plurality of variable characteristics in response to rotation of the wheel in the first submode, a second of said plurality of variable characteristics in response to rotation of the wheel in the second submode, a third of said plurality of variable characteristics in response to rotation of the wheel in the third submode, and a fourth of said plurality of variable characteristics in response to rotation of the wheel in the fourth mode.

2. The control apparatus of claim 1, wherein said at least one input member is a ring that is selectively rotatable about a third axis that is perpendicular to the first axis and the second axis; and wherein the control apparatus is configured such that rotation of the ring causes the controller to alternate between the first and second modes of operation.

3. The control apparatus of claim 2, wherein the ring defines an annular space, and wherein the wheel extends through said annular space.

4. The control apparatus of claim 1, further comprising a display operatively connected to the controller, and wherein the controller is configured to cause the display to depict first and second icons in the first mode and not in the second mode, and third and fourth icons in the second mode and not in the first mode.

5. The control apparatus of claim 4, wherein the controller is configured to alter the appearance of the first icon in response to rotation of the wheel in the first submode, to alter the appearance of the second icon in response to rotation of the wheel in the second submode, to alter the appearance of the third icon in response to rotation of the wheel in the third submode, and to alter the appearance of the fourth icon in response to rotation of the wheel in the fourth submode.

6. A control apparatus for a vehicle having first, second, third, and fourth variable characteristics, the control apparatus comprising:

a rotary collar being selectively rotatable about a first axis; a finger wheel being selectively rotatable about a second axis perpendicular to the first axis and being selectively pivotable about a third axis perpendicular to the first and second axes;

wherein the control apparatus is configured such that one of a) rotation of the collar, b) rotation of the finger wheel, and c) pivoting of the finger wheel causes the control apparatus to alternate between a first and a second mode of operation;

wherein another one of a) rotation of the collar, b) rotation of the finger wheel, and c) pivoting of the finger wheel in the first mode causes the control apparatus to alternate between first and second submodes and, in the second mode, causes the control apparatus to alternate between third and fourth submodes; and wherein the control apparatus is configured such that yet another one of a) rotation of the collar, b) rotation of the finger wheel, and c) pivoting of the finger wheel causes variation of the first variable characteristic in the first submode, the second variable characteristic in the second submode, the third variable characteristic in the third submode, and the fourth variable characteristic in the fourth submode.

7. The control apparatus of claim 6, further comprising a display; and wherein the control apparatus is configured such that the display depicts first and second icons in the first mode and not in the second mode, and third and fourth icons in the second mode and not in the first mode.

8. The control apparatus of claim 7, wherein the control apparatus is configured to alter the appearance of the first icon in response to rotation of the wheel in the first submode, to alter the appearance of the second icon in response to rotation of the wheel in the second submode, to alter the appearance of the third icon in response to rotation of the wheel in the third submode, and to alter the appearance of the fourth icon in response to rotation of the wheel in the fourth submode.

* * * * *